Oct. 11, 1960   A. E. SCHWANEKE   2,956,136
THERMOSTATIC CONTROL UNIT FOR COFFEE MAKERS OR THE LIKE
Filed Aug. 14, 1958   3 Sheets-Sheet 1

INVENTOR.
Alfred E. Schwaneke
BY
Oome, McDougall, Williams, + Hersh
Attorneys

Oct. 11, 1960  A. E. SCHWANEKE  2,956,136
THERMOSTATIC CONTROL UNIT FOR COFFEE MAKERS OR THE LIKE
Filed Aug. 14, 1958  3 Sheets-Sheet 2
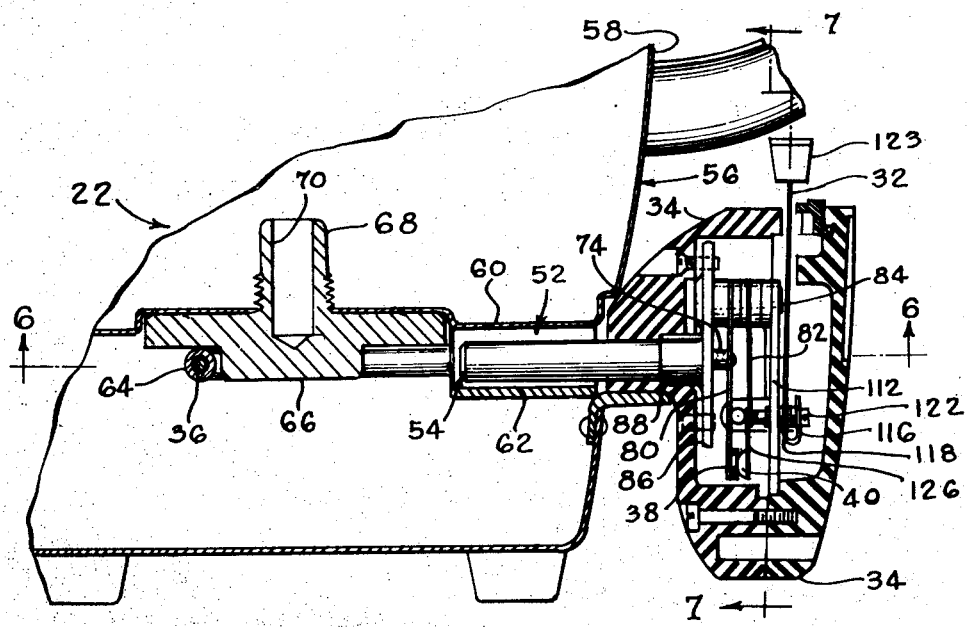
FIG. 5
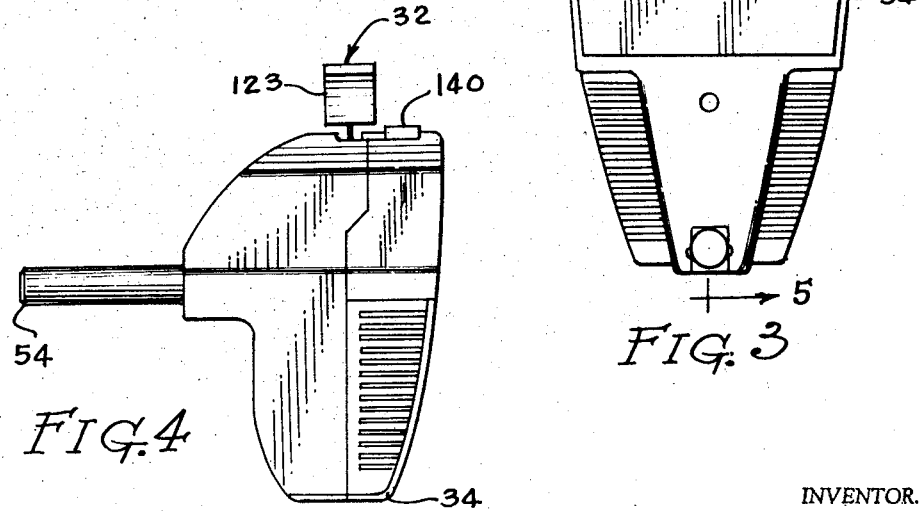
FIG. 4
FIG. 3
INVENTOR.
Alfred E. Schwaneke
BY
Ooms, McDougall, Williams & Hersh
Attorneys Oct. 11, 1960     A. E. SCHWANEKE     2,956,136
THERMOSTATIC CONTROL UNIT FOR COFFEE MAKERS OR THE LIKE
Filed Aug. 14, 1958     3 Sheets-Sheet 3
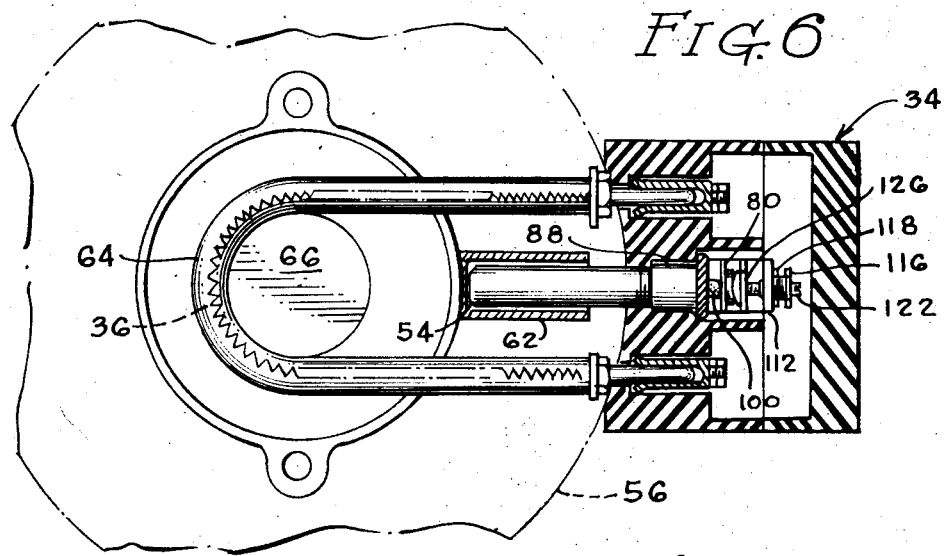
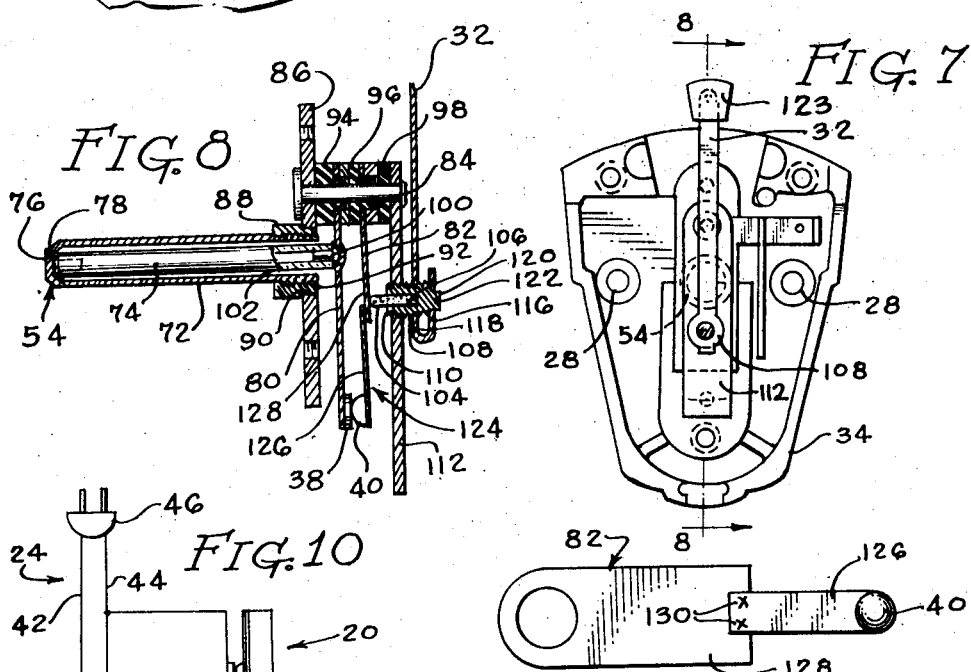
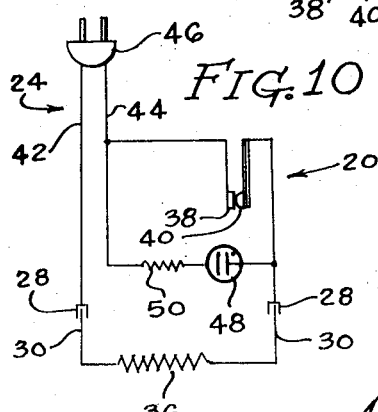
INVENTOR.
Alfred E. Schwaneke
BY
Ooms, McDougall, Williams & Hersh
Attorneys United States Patent Office 2,956,136
Patented Oct. 11, 1960

2,956,136

THERMOSTATIC CONTROL UNIT FOR COFFEE MAKERS OR THE LIKE

Alfred E. Schwaneke, Northbrook, Ill., assignor to AM Company, Chicago, Ill., a sole proprietorship Filed Aug. 14, 1958, Ser. No. 755,093

4 Claims. (Cl. 200—137)

This invention pertains to automatic electrical coffee makers, or similar appliances, and pertains particularly to thermostatic devices for controlling the operation of such appliances.

One object of the present invention is to provide a new and improved thermostatic control unit which will control the operation of an automatic coffee percolator, yet is formed as a unit distinct from the coffee maker so as to facilitate the construction of the coffee maker in a manner such that it may be immersed in water for cleaning.

A further object is to provide a new and improved thermostatic control unit of the foregoing character which will supply electrical energy to the coffee maker continuously for a sufficient interval to cause the coffee to be brewed, and then will reduce the supply of energy so as to terminate the brewing operation, while keeping the brewed coffee hot.

Another object is to provide a new and improved thermostatic control unit of the foregoing character which may be built into the receptacle adapted to be employed between the power cord and the coffee maker, with only two electrical connections between the receptacle and the coffee maker.

It is a further object to provide a thermostatic control unit of the foregoing character which is adapted to supply electrical energy continuously to initiate and complete the brewing operation, after which the electrical energy is supplied only intermittently to keep the coffee hot.

Still another object is to provide a new and improved thermostatic control unit of the foregoing character which is effective and reliable in operation, yet is remarkably simple and low in cost.

Further objects and advantages of the present invention will appear from the following description, taken with the accompanying drawings, in which:

Fig. 3 is a front view of the control unit of Fig. 1.

Fig. 4 is a left side view.

Fig. 5 is a fragmentary elevational section showing the control unit mounted on a coffee maker, the view being taken generally along a line 5—5 in Fig. 3.

Fig. 6 is a fragmentary horizontal section, taken generally along a line 6—6 in Fig. 5.

Fig. 7 is a vertical section, taken generally along the broken line 7—7 in Fig. 5.

Fig. 8 is a fragmentary enlarged elevational section, taken generally along a line 8—8 in Fig. 7.

Fig. 9 is an elevational view of a contact assembly employed in the control unit.

Fig. 10 is a schematic wiring diagram showing the arrangement of the control unit.

Figure 1:
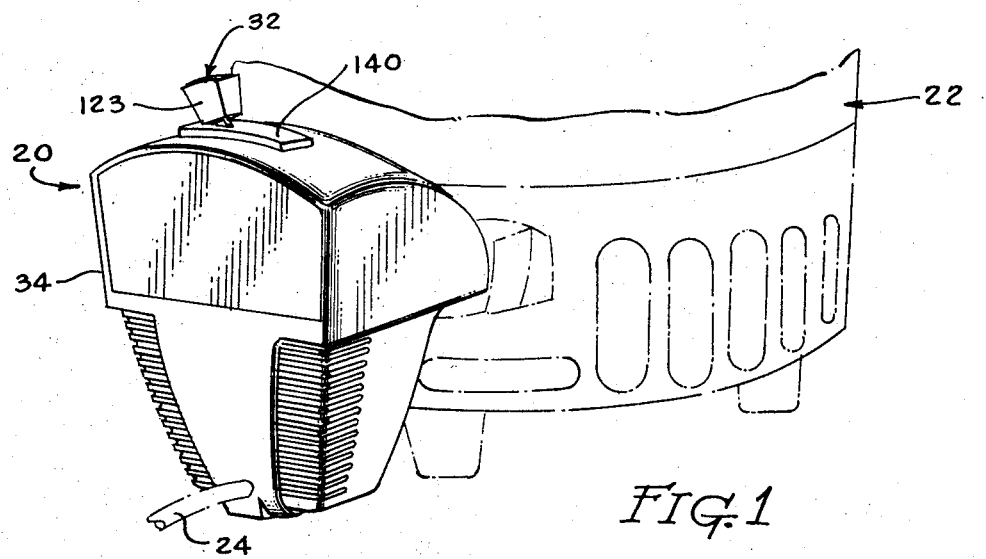
Fig. 1 is a perspective view of a thermostatic control unit to be described as an illustrative embodiment of the present invention, the control unit being shown mounted on an automatic electric percolator or other coffee maker.
Figure 2:
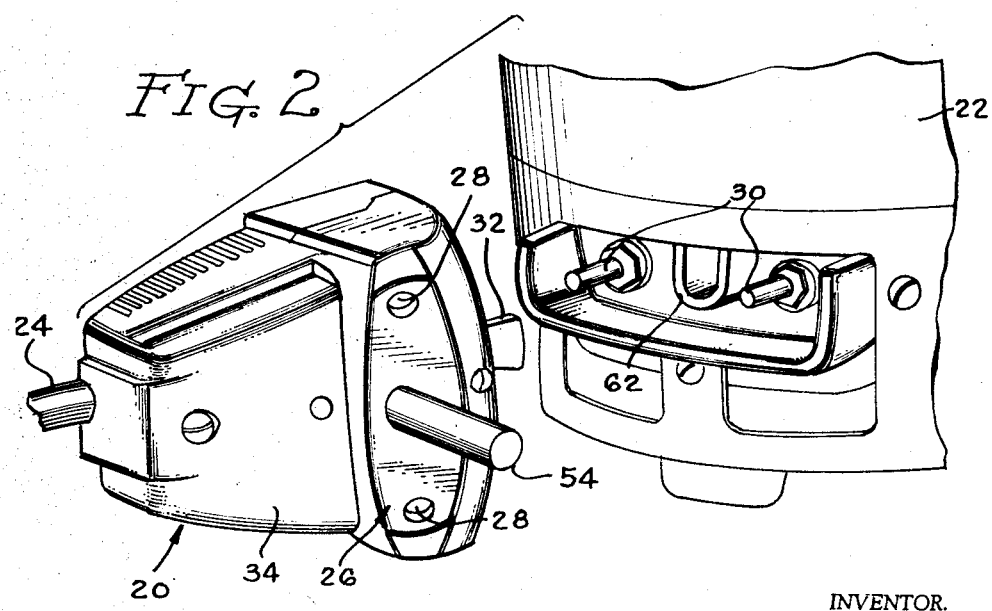
Fig. 2 is a perspective view, similar to Fig. 1, but showing the control unit detached from the coffee maker.

As already indicated, Figures 1 and 2 illustrate a thermostatic control unit 20 adapted to be used to control the operation of an automatic electric coffee maker 22, which preferably takes the form of a percolator, but may be of some other type in some cases. The control unit 20 is separate and distinct from the coffee maker 22. Thus, the entire control unit 20 may be detached from the coffee maker. This makes it easy to construct the coffee maker so that it may be immersed in water for washing. The control unit 20 does not require cleaning and hence may be detached from the coffee maker when it is to be washed. It will be seen that the control unit 20 is supplied with electrical energy by a conventional power cord 24. The control unit 20 embodies a receptacle 26 having a pair of receptacle contacts 28 for supplying electrical energy to prongs 30 on the coffee maker 22. It will be noted that only two electrical connections are needed between the control unit 20 and the coffee maker 22. This is the same number that would be needed simply to connect the power cord to the coffee maker.

The illustrated control unit 20 is provided with a movable selector element in the form of an arm or lever 32. The strength of the coffee to be brewed may be varied by adjusting the position of the lever 32.

The entire control unit 20, as well as the receptacle 28, is mounted in a housing 34, which may be made in two or more pieces from plastic or other suitable material. As shown in Fig. 2, the unit 20 may readily be detached from the coffee maker 22.

In this case the coffee maker 22 has a single electrical heating element 36 which serves not only to brew the coffee, but also to keep the coffee hot after the brewing operation has been completed. As indicated in Fig. 10, the ends of the heating element 36 are connected to the plug prongs 30.

The supply of electrical energy to the receptacle contacts 28 is controlled by the electrical contacts 38 and 40, embodied in the control unit 20. In accordance with the usual arrangement, the power cord 24 simply has two conductors or leads 42 and 44 connected to a plug 46 which may be inserted into any convenient household outlet. It is preferred to operate the control unit and the coffee maker on alternating current at some suitable voltage, such as 115 volts.

The lead 42 of the power cord 24 is simply connected to one of the receptacle contacts 28. It will be seen that the other lead 44 is connected to the control contact 38, while the other control contact 40 is connected to the other receptacle contact 28. In a manner to be described presently, the control unit 20 is adapted to open and close the contacts 38 and 40 in such a manner as to carry out the brewing operation, and then keep the coffee hot.

It is preferred to provide an indicator so that it will be apparent that the brewing operation has been completed. In this case, such an indicator is provided, simply by connecting a small lamp 48 across the contacts 38 and 40. The illustrated lamp 48 is of the gas discharge type, having neon or some other suitable gas therein. A current limiting resistor 50 of fairly high value is connected in series with the lamp 48. When the contacts 38 and 40 are closed, the lamp 48 will not be lighted. When the contacts 38 and 40 are opened to terminate the brewing operation, the lamp 48 will be lighted.

As shown to advantage in Fig. 5, a thermostat 52 is provided to operate the contacts 38 and 40. The illustrated thermostat 52 is of the differential expansion type. Moreover, it is arranged to be responsive to the temperature of the coffee maker 22 while providing for detachment of the control unit 20 from the coffee maker. Thus, the thermostat 52 comprises an elongated probe 54 projecting from the control unit 20 and adapted to be inserted into the lower end portion of the coffe maker 22. From Fig. 5, it will be apparent that the illustrated coffee maker 22 comprises a pot 56 with side and bottom walls 58 and 60. The probe 54 is adapted to be inserted into the coffee maker 22, just under the bottom wall 60. Thus, the thermostatic probe 54 will be responsive to the temperature of the bottom wall. A sleeve or ring 62 may be welded or otherwise secured to the bottom wall 60 and may be arranged to extend around the probe 54 so as to transmit heat from the bottom wall to the probe. It will be apparent that the probe 54 is telescopically receivable within the sleeve 62.

In this case, the electrical heating element 36 of the coffee maker 22 is enclosed within a hermetically sealed metal tube 64 and is suitably insulated therefrom. This type of heating element is well known in the art. With this arrangement, the coffee maker 22 may be immersed in water without damaging the coffee maker in any way.

The protective tube 64, around the heating element 36, engages a thick disk or block of metal 66 which is welded or otherwise secured to the bottom wall 60. The disk 66 is highly heat conductive so as to carry the heat from the heating element 36 to the coffee pot 56. The illustrated disk 66 has a centrally disposed projection 68 which extends upwardly through a suitable opening in the bottom wall 60. A well 70 is formed within the projection 68 to facilitate the percolation of the coffee, in a manner known in the art.

From Fig. 8, it will be apparent that the illustrated thermostatic probe 54 comprises a hollow tubular outer member 72, with an inner member 74 received therein. The outer and inner members 72 and 74 are made of different materials so as to have substantially different co-efficients of thermal expansion. For example, the outer tubular member 72 may be made of a metal such as aluminum, while the inner member 74 may take the form of a ceramic tube. With this arrangement, the outer member 72 has a substantially higher co-efficient of expansion than the inner member 74. By selection of other materials, this situation might be reversed.

In the illustrated construction, the outer member 72 has a closed end wall 76 at its rearwardly projecting end. A metal rivet or other end piece 78 may be mounted on the rear end of the ceramic tube 74 to protect the tube from damage due to shock or vibration. The arrangement is such that the end piece 78 is held against the inside of the end wall 76. This arrangement prevents relative movement between the rear ends of the outer and inner members 72 and 74. Thus, any differential expansion of the members 72 and 74 is manifested as differential movement between the front ends of the members.

The illustrated contacts 38 and 40 are arranged to be operated by the differential movement between the front ends of the members 72 and 74. In this case, the contacts 38 and 40 are mounted on the outer or lower ends of substantially parallel leaf springs 80 and 82. By means of a post 84 the upper ends of the springs 80 and 82 are securely mounted on a plate or other member 86 connected to the outer tubular member 72 of the thermostatic probe 54. Actually, a bushing 88 is interposed between the member 72 and the plate 86. As shown, the bushing 88 is brazed or otherwise suitably secured into a suitable hole 90 in the plate 86. The tubular member 72 is tightly threaded into the bushing 88 and may also be welded or otherwise rigidly secured to the bushing, as indicated by the illustrated welds 92. With this construction any slippage between the members 72 and the plate 86 is prevented. While the contact springs 80 and 82 are mechanically secured to the post 84, they are electrically insulated therefrom by a series of insulating washers 94, 96 and 98.

In effect, the front end of the ceramic tube 74 is connected to one of the contacts 38 and 40. In the illustrated arrangement, a protective metal end piece 100 is mounted on the front end of the ceramic tube 74. The end piece 100 engages the contact spring 80 at a point spaced only a short distance from the mounting post 84. On the other hand, the contact 38 is at the extreme lower end of the spring 80 and thus is spaced a much greater distance from the post 84. With this arrangement, the differential movement between the front ends of the members 72 and 74 is multiplied by the spring 80 so that the resulting movement of the contact 38 is much greater.

To provide for adjustment of the thermostatic control unit 20, an adjustable stop 104 is arranged to engage the other contact spring 82. In this case, the stop 104 takes the form of an insulated rod or tube mounted in a socket 106 which is formed in the rear end of an adjustable screw 108. The screw 108 is mounted in a threaded opening 110 which is formed in a plate or other member 112. It will be apparent from Fig. 8 that the plate 112 is rigidly secured to the front end of the mounting post 84. Thus, the plate 112 is rigidly connected to the plate 86 which supports the outer member 72 of the probe 54.

The adjusting lever 32 is connected to the screw 108. In this case, the lever 32 has a U-shaped lower portion with front and rear legs 116 and 118. The rear leg 118 is threaded on to the screw 108, while the front leg 116 is apertured to receive a reduced front end portion 120 on the screw. The lever 32 may be threaded on to the screw 108 until the front leg 116 is flexed sufficiently to afford substantial frictional resistance to relative rotation between the screw and the lever. The frictional connection between the lever and the screw will cause the screw to rotate when the lever is swung back and forth. For purposes of initial calibration, the rear end of the screw 108 may be formed with a screw driver slot 122, so that the screw may be rotated relative to the lever 32. As illustrated, the upper end of the lever 32 is fitted with a handle 123 made of plastic.

In order to provide for keeping the coffee hot after it has been brewed, the illustrated control unit 20 is provided with an additional thermostatic element 124 which is responsive to electrical heating due to the passage of electrical current between the contacts 38 and 40. In the illustrated arrangement, at least a portion of one of the contact springs 80 and 82 takes the form of a bimetal strip 126 which is heated by the current flowing between the contacts 38 and 40 when they are engaged. As indicated in Figs. 8 and 9, the preferred arrangement is to form the bimetal strip 126 as the lower end portion of the front contact spring 82. A plain spring metal strip 128 may constitute the remainder or upper portion of the spring 82. As indicated by welds 130, the bimetal 126 may be welded or otherwise suitably secured to the strip 128. The contact 40 is secured to the lower end of the bimetal 126. It will be understood that the front and rear sides of the bimetal 126 are made of different metals, welded together. The metals have different co-efficients of expansion so that the bimetal will tend to curl as it is heated. In this case, the bimetal is oriented so that it tends to curl away from the contact spring 80 as the bimetal is heated, thus the heating of the bimetal 126 tends to cause the contact 40 to separate from the contact 38.

Initially, the stop screw 108 is adjusted so that the contacts 38 and 40 are closed at room temperature. When it is desired to brew coffee, the control unit 20 is plugged into the coffee maker 22 and the line cord 24 is connected to a source of electrical energy. Electrical current then flows through the heating element 36 and the closed contacts 38 and 40. The heating element 36 heats the water in the pot 58 and causes the pot to percolate so that the coffee will be brewed.

The electrical current through the contacts 38 and 40 heats the bimetal 126 and causes the bimetal to curl forwardly. However, the curling of the bimetal 126 is not sufficient to separate the contact 40 from the contact 38, due to the initial set and adjustment of the springs 80 and 82. As the brewing operation progresses the temperature of the pot 58 increases. Heat from the lower wall 60 of the pot is transmitted to the probe 54. As a result, the outer metal member 72 expands more than the inner ceramic member 74. This permits the front end of the ceramic member 74 to move rearwardly under the biasing action of the spring 80. Due to the initial set and adjustment of the spring 82, the contact 38 does not immediately separate from the contact 40. However, when the pot has become sufficiently heated to complete the brewing operation, such separation of the contacts 38 and 40 does occur, due to the differential expansion of the members 72 and 74. The operation of the contacts stops the flow of current through the heating element 36, with the result that the brewing operation is terminated. The opening of the contacts 38 and 40 energizes the neon lamp 48 which thus shows that the coffee has been brewed and is ready to serve. In the illustrated unit 20, the lamp 48 is disposed within the housing 34, but it is visible through a window 140 in the upper side thereof.

When the contacts 38 and 40 are separated, the current no longer flows through the bimetal 126. Accordingly, the bimetal cools, so that the forward curl of the bimetal becomes progressively less pronounced. After the bimetal 126 has cooled sufficiently, the contact 40 engages the contact 38 to reestablish the circuit through the heating element 36. The current then flows again through the bimetal 126 and soon heats the bimetal so that the contact 40 is again separated from the contact 38. Thus, the alternate heating and cooling of the bimetal 126 causes intermittent closure of the contacts 38 and 40 in a cyclical fashion. The resulting intermittent operation of the heating element 36 supplies sufficient heat to the coffee maker 22 to keep the brewed coffee hot, but not sufficient heat to cause resumption of the brewing operation.

The bimetal 126 has a substantial electrical resistance so that the current through the bimetal will cause sufficient heating to curl the bimetal back and forth as just described. Of course, the resistance of the bimetal will depend upon the cross section and length of the bimetal and the specific resistance of the materials employed therein. As shown in Fig. 9, the illustrated bimetal 126 is made relatively long and narrow to increase its resistance. In production, the resistance of the bimetal may be controlled by cutting down its width, either locally or along the entire length thereof.

Swinging the lever 32 will rotate the screw 108 and thus will change the initial set of the contact spring 82. If the lever 32 is swung in one direction, the initial pressure between the contacts 38 and 40 will be increased. This will increase the temperature at which the brewing operation will be terminated and thus will produce stronger coffee. Movement of the lever in the opposite direction will reduce the strength of the coffee produced by the coffee maker.

Despite the fact that there are only two electrical connections between the control unit 20 and the coffee maker 22, the control unit is able to control the brewing of the coffee and then keep the coffee hot. The arrangement of the control unit has the additional advantage of requiring only one heating element in the coffee maker. Thus, the control unit is highly economical, in addition to being efficient and reliable.

Various modifications, alternative constructions and equivalents may be employed without departing from the the true spirit and scope of the invention, as exemplified in the foregoing description and defined in the following claims.

I claim:

1. In a thermostatic control unit for coffee makers or the like, the combination comprising a tubular probe having a hollow metal outer member with a closed end wall at one end thereof, a rod received within said outer member and having one end engaging said end wall, the opposite end of said rod extending out of and beyond the opposite end of said outer member, said rod being made of a ceramic material having a coefficient of thermal expansion substantially less than that of said outer member so that heating of said member and said rod will lengthen said member substantially more than said rod, a mounting element secured to said outer member, first and second generally parallel spring leaves mounted on said mounting element but electrically insulated therefrom, first and second contacts engageable with each other and mounted on the outer ends of said spring leaves, said first spring leaf engaging the free end of said rod and biasing said rod into said outer member to maintain the inner end of said rod against said end wall, said spring leaves being made of electrically conductive metal to conduct current to said contacts, a stop screw engageable with said second leaf for adjusting the position thereof, said first contact being normally engageable with said second contact but being adapted to be disengaged therefrom by predetermined heating of said outer member, said second leaf having an outer portion in the form of a bimetallic strip disposed between said stop screw and said second contact, said bimetallic strip having a first side portion of relatively high thermal expansion and a second side portion of relatively low thermal expansion, said first side portion facing toward said first spring leaf, said bimetallic strip having substantial electrical resistance so as to be heated to a substantial extent by electrical current passing through said contacts when said contacts are closed, said bimetallic strip thereby being effective to curl away from said first contact in response to the passage of current through said contacts, said bimetallic strip being effective to uncurl and close said contacts intermittently in a cyclical fashion after initial opening of said contacts by heating of said outer member of said probe.

2. In a thermostatic control unit for coffee makers or the like, the combination comprising a tubular probe having a hollow metal outer member with a closed end wall at one end thereof, a rod received within said outer member and having one end engaging said end wall, the opposite end of said rod extending out of and beyond the opposite end of said outer member, said rod having a coefficient of thermal expansion substantially less than said outer member so that heating of said member and said rod will lengthen said member substantially more than said rod, a mounting element connected to said outer member, first and second contacts movable into and out of engagement with each other, first and second metal spring leaves having their outer ends connected to said contacts for supporting said contacts and conducting electrical current to said contacts, means mounting the inner ends of said leaves on said mounting element while electrically insulating said leaves therefrom, said first spring leaf engaging the free end of said rod and biasing said rod into said member to maintain the inner end of said rod against said end wall, a stop screw engageable with said second leaf for adjusting the position thereof, said first contact being normally engaged with said second contact but being adapted to be disengaged therefrom by predetermined heating of said probe, said second leaf having an outer portion in the form of a bimetallic strip connected to said second contact for conducting current thereto, said bimetallic strip having substantial electrical resistance so as to be heated to a substantial extent by the electrical current flowing through said contacts when said contacts are closed, said bimetallic strip having opposite side portions of relatively high and relatively low thermal expansion, said side portion of relatively high expansion facing toward said first contact, said bimetallic strip being effective to curl away from said first contact in response to electrical heating due to current through said contacts when said contacts are closed, said bimetallic portion being effective to uncurl and close said contacts intermittently after initial opening of said contacts by heating of said probe.

3. In a thermostatic control unit for coffee makers or the like, the combination comprising a tubular probe having a hollow outer member with an end wall at one end thereof, a rod received within said outer member, said rod having its inner end engaging said end wall and its outer end extending out of and beyond the opposite end of said outer member, said rod and said outer member having substantially different co-efficients of thermal expansion, a mounting element connected to said outer member, first and second contacts movable into and out of engagement with each other, first and second metal leaf springs having their outer ends connected to said contacts for supporting said contacts and conducting electrical current thereto, means mounting the inner ends of said leaf springs on said mounting element, said first leaf spring being engaged with said outer end of said rod, heating of said probe being effective to open said first and second contacts, one of said springs comprising a bimetallic strip having substantial electrical resistance so as to be heated to a substantial extent by current through said contacts when said contacts are closed, said bimetallic strip having opposite side portions of relatively high and relatively low thermal expansion, said side portion of relatively high expansion facing toward the contact on the other leaf spring, said bimetallic strip being effective to curl away from the other contact due to electrical heating by current through said contacts, said bimetallic strip being effective to uncurl and close said contacts intermittently after initial opening of said contacts by heating of said probe.

4. In a thermostatic control unit, the combination comprising a thermostatic probe having first and second telescopically disposed members of different co-efficients of thermal expansion, means retaining corresponding ends of said members against relative movement, a mounting element secured to the opposite end of said second member, first and second engageable contacts, first and second leaf springs having inner ends mounted on said mounting element, said springs having outer ends connected to said contacts for supporting said contacts and conducting electrical current thereto, said first spring being connected to the opposite end of said first member of said probe so that heating of said probe will open said contacts, one of said springs comprising a bimetallic strip of substantial electrical resistance connected to one of said contacts for electrical heating by passage of current through said strip when said contacts are closed, said bimetallic strip having opposite side portions of relatively high and relatively low thermal expansion, said side portion of relatively high thermal expansion facing toward the other of said contacts, said bimetallic strip being effective to curl away from said other contact in response to electrical heating by current through said contacts, said bimetallic strip being effective to uncurl and close said contacts intermittently after initial opening of said contacts by heating of said probe.

References Cited in the file of this patent
UNITED STATES PATENTS

| | | |
|---|---|---|
| 1,321,287 | Daly | Nov. 11, 1919 |
| 2,325,511 | Heintzen | July 27, 1943 |
| 2,365,615 | Woodman | Dec. 19, 1944 |
| 2,742,546 | Cart | Apr. 17, 1956 |
| 2,817,741 | Turner | Dec. 24, 1957 |
| 2,830,166 | Loomis | Apr. 8, 1958 |